United States Patent Office 2,987,508
Patented June 6, 1961

2,987,508
METHOD OF THERMALLY CROSS-LINKING AN ALKYLVINYLAROMATIC HYDROCARBON POLYMER
Norman R. Ruffing and James L. Amos, Midland, Mich., assignors to The Dow Chemical Company, Midland, Mich., a corporation of Delaware
No Drawing. Filed Mar. 11, 1957, Ser. No. 644,994
6 Claims. (Cl. 260—85.5)

This invention concerns a process for thermally cross-linking polymers of alkylvinylaromatic hydrocarbons. More particularly, it relates to a thermal process for cross-linking polymers of alkylvinylaromatic hydrocarbon monomers of the type indicated by the following formula

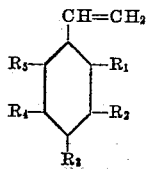

wherein $R_1$, $R_2$, $R_3$, $R_4$, and $R_5$ individually represent a member of the group consisting of hydrogen and alkyl radicals containing from one to 4 carbon atoms at least one substituent of which is alkyl, and wherein from one to 2 of the $R_2$, $R_3$ and $R_4$ groups are alkyl when at least one of the $R_1$ and $R_5$ groups is alkyl.

It has been believed until the present time, and the art so teaches, that when a polymeric vinylaromatic hydrocarbon is heated to an elevated temperature, depolymerization occurs to a greater or lesser extent depending upon the time and temperature of heating.

It has now been discovered that polymers of alkylvinylaromatic hydrocarbons, as indicated above, and copolymers thereof containing at least 38 mole percent of such alkylvinylaromatic hydrocarbons, can be cross-linked by heating at temperatures between 240° and 260° C Within such temperature limits, a reaction time between about 8 hours and 7 days is most advantageous, the time of heating being inversely proportional to the temperature of reaction. The reaction occurs in mass. Thermoplastic polymers and copolymers may be comminuted, as desired, prior to the cross-linking reaction.

By way of example, thermoplastic polymers of the following alkylvinylaromatic hydrocarbons have been cross-linked pursuant to the practice of this invention: m-vinyltoluene, p-vinyltoluene; dimethylstyrenes, except 2,6-dimethylstyrene; and ar-chloro-ar-methylstyrenes, except 2-chloro-6-methylstyrene. Examples of thermoplastic copolymers which have been cross-linked pursuant to the practice of this invention include those of at least 38 mole percent of at least one of the preceding monomers, the balance being one or more monoethylenic unsaturated comonomers copolymerizable therewith, such as styrene, alpha-methylstyrene, arcylonitrile, acrylate esters, methacrylate esters, vinyl chloride, vinyl acetate, and the like.

In practice, a thermoplastic polymer or copolymer of the type indicated is heated at an elevated temperature, suitably between 240° and 260° C., advantageously in the presence of an inert gas such as nitrogen, carbon dioxide, helium, neon, or argon for a time sufficient to get the amount of cross-linking desired. This is readily determined, since the starting thermoplastic polymer or copolymer is soluble in aromatic hydrocarbon solvents, whereas the cross-linked polymers and copolymers are insoluble in aromatic hydrocarbon solvents. Intermediately cross-linked products are determined conventionally by solution viscosity changes or degree of swelling.

The following examples show ways in which the invention has been practiced.

*Example 1*

Two 150 g. samples of a commercial vinyltoluene (65 percent meta and 35 percent para isomers), were placed in glass ampoules ⅞ in. in diameter and 12 in. long. Nitrogen was introduced to flush residual air from the ampoules, after which the ampoules were sealed. The ampoules were heated under a polymerization schedule of two days at 130° C. and one day at 150° C. to give essentially complete polymerization of the monomer. The ampoules were placed in an upright position in an electrically heated oven maintained at 240° C. so that the polymer mass was in the lower end of the ampoule. After allowing one hour for the polymer to reach oven temperature, one of the samples was inverted so that the polymer was suspended from the upper end of the ampoule. Under the influence of heat and gravity, this polymer flowed slowly but steadily from the upper to the lower portion of the ampoule. The other ampoule was allowed to remain in its original position for a 24-hour period, after which it was inverted to check the flow rate, as described above. This sample did not flow at all and was insoluble in toluene.

*Example 2*

Five samples of a commercial thermoplastic polyvinyl toluene, 30 cps. viscosity (10 weight percent solution in toluene), were heated at elevated temperatures, as stated in the following table, for times sufficient to give products which would not flow and were insoluble in toluene. The following table indicates the time-temperature schedule required to give the cross-linked products described above.

TABLE I

| Time, hours | Temperature, degrees C. |
|---|---|
| 8 | 260 |
| 12 | 250 |
| 72 | 240 |
| 372 | 220 |
| 135 days | 200 |

*Example 3*

Various thermoplastic polymers and copolymers of vinyltoluene were cross-linked to insolubility in toluene by heating at 240° C. for various times, as indicated in the following table.

TABLE II

| Mole Percent Vinyltoluene | Mole Percent Comonomer | Time (days) to Crosslink at 240° C. |
|---|---|---|
| 100 (65 meta, 35 para) | | 4.0 |
| 72.6 | 27.4 Styrene | 4.0 |
| 46.8 | 53.2 Styrene | 7.0 |
| 95 | 5 alpha-Methylstyrene | 3.0 |
| 90 | 10 alpha-Methylstyrene | 3.0 |
| 85 | 15 alpha-Methylstyrene | 2.0 |
| 80 | 20 alpha-Methylstyrene | 2.0 |
| 75 | 25 alpha-Methylstyrene | 2.0 |
| 70 | 30 alpha-Methylstyrene | 2.0 |
| 38 | 43.1 Styrene, 18.9 alpha-Methylstyrene. | 3.0 |
| 42.4 | 48.2 Styrene, 9.4 alpha-Methylstyrene. | 4.0 |
| 89.5 | 10.5 Acrylonitrile | 6.0 |
| 45.8 | 54.2 Methylmethacrylate | 1.0 |
| 71.8 | 28.2 Methylmethacrylate | 1.0 |
| 45.8 | 54.2 Ethyl Acrylate | 2.0 |
| 71.8 | 28.2 Ethyl Acrylate | 4.0 |
| 81.5 | 18.5 2,5-Dichlorostyrene | 1.0 |
| 59.4 | 40.6 2,5-Dichlorostyrene | 1.0 |
| 77.9 | 22.1 o-Chlorostyrene | 1.0 |
| 53.8 | 46.2 o-Chlorostyrene | 1.0 |

Example 4

The following table shows the reaction times necessary to cross-link various thermoplastic polymers and copolymers of isomeric dimethylstyrenes at 240° C.

TABLE III

| Mole Percent Polymers and Copolymers | Days to Crosslink at 240° C. |
|---|---|
| 100 3,5-Dimethylstyrene | 6 |
| 70.2 3,5-Dimethylstyrene<br>29.8 Styrene | 7 |
| 78.2 3,5-Dimethylstyrene<br>21.8 alpha-Methylstyrene | 3 |
| 100 2,4-Dimethylstyrene | 6 |

Example 5

Thermoplastic polymers of para-vinyltoluene, 12.4 cps. viscosity, and meta-vinyltoluene, 17.4 cps. viscosity, were cross-linked to insolubility by heating at 240° C. The polymer of meta-vinyltoluene required 8 days' heating, while the polymer of para-vinyltoluene required 12 days' heating. Higher molecular weight polymers, as shown in Example 2, can be cross-linked in less than 24 hours.

What is claimed is:

1. A method for thermally cross-linking a thermoplastic polymer of the group consisting of homopolymers of

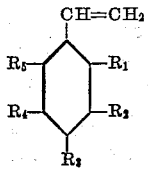

wherein $R_1$, $R_2$, $R_3$, $R_4$, and $R_5$ individually represent a member of the group consisting of hydrogen and alkyl radicals having one to 4 carbon atoms, at least one substituent of which is alkyl, and wherein from one to 2 of the $R_2$, $R_3$, and $R_4$ groups are alkyl when at least one of the $R_1$ and $R_5$ groups is alkyl, and copolymers of at least 38 mole percent thereof with at least one monomeric monoethylenic comonomer copolymerizable therewith, which method consists in heating said polymer at temperatures between 240° and 260° C. for a time between 8 hours and 7 days to give a cross-linked polymeric product.

2. The method of claim 1 wherein the monomeric component is a mixture of meta- and para-vinyltoluene.

3. The method of claim 2 wherein the thermoplastic copolymer contains a balance of styrene.

4. The method of claim 2 wherein the thermoplastic copolymer contains a balance of alpha-methylstyrene.

5. The method of claim 2 wherein the thermoplastic copolymer contains a balance of methyl methacrylate.

6. The method of claim 2 wherein the thermoplastic copolymer contains a balance of acrylonitrile.

References Cited in the file of this patent

UNITED STATES PATENTS

| | | |
|---|---|---|
| 2,475,002 | Biggs | July 5, 1949 |
| 2,594,579 | Novotny | Apr. 29, 1952 |
| 2,638,465 | Amos et al. | May 12, 1953 |
| 2,738,894 | Vaughan | Feb. 14, 1956 |
| 2,811,514 | Hagemeyer | Oct. 29, 1957 |

FOREIGN PATENTS

| | | |
|---|---|---|
| 443,405 | Great Britain | Feb. 27, 1936 |

OTHER REFERENCES

"Chemistry of High Polymer Degradation Processes," by Gassie, pub. 1956 by Butterworths Scientific Publications, pages 52–62.